United States Patent [19]

Kelley

[11] 4,034,128
[45] July 5, 1977

[54] PRODUCTION OF A COLOR DEVELOPING RECORD SHEET CONTAINING METAL-MODIFIED NOVOLAK RESIN PARTICLES

[75] Inventor: Russell D. Kelley, Waverly, Ohio

[73] Assignee: The Mead Corporation, Dayton, Ohio

[22] Filed: May 5, 1975

[21] Appl. No.: 575,055

[52] U.S. Cl. .............................. 427/150; 260/29.3; 282/27.5; 427/145; 427/146; 427/261; 428/454; 428/530; 428/537; 428/539; 428/914

[51] Int. Cl.² .................... B41M 5/12; B41M 5/16

[58] Field of Search .......... 427/150, 261, 146, 145; 428/307, 207, 539, 530, 537, 454, 914; 282/27.5; 252/316; 260/29.3

[56] References Cited

UNITED STATES PATENTS

| | | | |
|---|---|---|---|
| 2,800,457 | 7/1957 | Green et al. | 252/316 |
| 3,455,721 | 7/1969 | Phillips et al. | 282/27.5 |
| 3,516,845 | 6/1970 | Brockett | 428/539 |
| 3,672,935 | 6/1972 | Miller et al. | 282/27.5 |
| 3,732,120 | 5/1973 | Brockett et al. | 428/307 |

*Primary Examiner*—Thomas J. Herbert, Jr.
*Attorney, Agent, or Firm*—Stephen H. Cagle; Wilson G. Palmer

[57] ABSTRACT

Rheologically stable aqueous dispersions of metal-modified novolak resin particles are prepared by grinding an aqueous mixture of the metal-modified novolak resin and anionic polymeric dispersing agent in the presence of a small amount of an organo-phosphorus compound containing two or more phosphonic acid or alkali metal phosphonate groups per molecule. Dispersions of the metal-modified resin particles so produced may be incorporated in color developing coating compositions containing a binder which may be applied and dried on a carrier paper to produce a pressure-sensitive record sheet.

15 Claims, No Drawings

PRODUCTION OF A COLOR DEVELOPING RECORD SHEET CONTAINING METAL-MODIFIED NOVOLAK RESIN PARTICLES

BACKGROUND OF THE INVENTION

This invention relates to the production of a color developing record sheet for pressure-sensitive papers having a coating of metal-modified para-substituted phenolformaldehyde novolak resin as the color developers. More particularly, it relates to an improved method of grinding and stabilizing a particulate metal-modified novolak resin dispersion prior to preparation of the color developing coating composition by adding to the resin dispersion containing an anionic polymeric dispersing agent prior to grinding a small amount of an organo-phosphorus compound containing two or more phosphonic acid or alkali metal phosphonate groups per molecule.

Metal-modified novolaks are useful as developing agents for colorless color procursors such as Crystal Violet Lactone. Color producing systems of this type are useful in pressure-sensitive manifolding systems wherein a color developer, a color precursor and a common solvent for each are maintained in isolation on separate surfaces of a carrier. Conveniently, the color precursor and the solvent may be encapsulated in microcapsules of the type described in U.S. Pat. No. 2,800,457 and said microcapsules together with an adhesive may be applied as a coating to a web of paper. The color developer may be applied as a coating to a second web of paper, generally with a clay, such as kaolin clay or silton clay. When the two webs of paper are superimposed with their respective coatings in contact and subjected to localized pressure as by a typewriter key, the walls of the microcapsules in the area subjected to pressure are ruptured and the solution of color precursor and solvent originally contained in the ruptured capsules is transferred in a marking pattern to the paper surface carrying the color developer. Almost instantaneously a colored mark is formed on the surface carrying the color developer.

The use of finely ground dispersions of phenolformaldehyde novolak resins as the color developer in the preparation of pressure-sensitive record sheets is known. In the preparation of the ground dispersions of resin a number of dispersing agents for the resin have been used. U.S. Pat. No. 3,672,935 teaches the use of sodium silicate, gum arabic, casein, hydroxyethylcellulose or a latex, such as styrenebutadiene latex, for this purpose. Preparation of a ball milled resin dispersion containing 10% resin particles is disclosed.

The use of anionic polymeric type dispersing agents such as "Tamol 731" for dispersing a phenolformaldehyde resin during grinding in an attritor is disclosed in U.S. Pat. No. 3,516,845. The ground resin is compounded into an aqueous coating composition containing a soluble metal salt and the coating composition is applied to a paper and dried to form a pressure-sensitive record sheet. U.S. Pat. No. 3,732,120 discloses the use of a metal resinate, such as the reaction product of para-phenylphenolformaldehyde resin with zinc hydroxybenzoate as the color developer in pressure-sensitive record sheets. The metal resinate may be ground and applied as a coating to paper as taught by U.S. Pat. Nos. 3,445,721 or 3,672,935.

Using the dispersing agents suggested by the prior art, rheologically stable grinds of finely divided phenolformaldehyde novolak resin particles may be conveniently prepared and used to prepare stable color developing coating compositions. The preparation of rheologically stable grinds containing finely divided metal-modified phenolformaldehyde novolak resin particles is much more difficult. This is particularly true where the resin solids exceed 35% and temperatures above 68° F are reached during the grinding period. Under these conditions, the dispersing agents normally used for dispersing the nonmodified phenolformaldehyde resin are not sufficient to give stable dispersions even when more than the normal amount of a dispersing agent is added. The dispersions do not remain fluid on standing after grinding and in extreme cases set up and cake during the after grinding period. This condition is aggravated by the long grinding periods encountered in the grinding of large volumes of resin dispersion for commercial production.

Using the process of this invention, the above difficulties can be overcome and rheologically stable grinds of metal-modified resin particles can be consistently produced in quantities required for commercial use. Such grinds are fluid enough to be handled in commercial equipment and will remain fluid on standing if there is a delay in the production process.

STATEMENTS OF THE INVENTION

In accordance with the present invention, a process is provided for producing a color developing record sheet for pressure-sensitive papers whereby a metal-modified novolak resin is first dispersed and ground in an aqueous medium containing an anionic polymeric dispersing agent and a small amount of an organo-phosphorus compound containing two or more phosphoric acid or alkali metal phosphonate groups per molecule to form an aqueous dispersion containing up to 58% metal-modified resin at an average particle size of less than 10 microns. The ground particulate dispersions so produced may be incorporated in the usual way into a color developing coating composition containing a binder. The coating composition may be applied to a carrier paper and dried thereon to produce a color developing record sheet. In a preferred form of the invention, the dispersing agent includes also a complex phosphate, such as sodium hexametaphosphate.

In another feature of the invention, there is provided a rheologically stable aqueous dispersion containing up to 58% particulate metal-modified novolak resin having an average particle size of less than 10 microns also containing an anionic polymeric dispersing agent and a small amount of an organo-phosphorus compound containing two or more phosphonic acid or alkali metal phosphonate groups per molecule.

DETAILED DESCRIPTION OF THE INVENTION

The metal-modified resins useful in the practice of this invention are the metal salts of the para-substituted phenolformaldehyde resins. They may be conveniently prepared by melting together a para-substituted phenolformaldehyde novolak resin with a metal salt and an ammonium salt and cooling the mixture to a solid. Such a process is described in U.S. application Ser. No. 528,039 filed Nov. 29, 1974, and now abandoned, and assigned to the assignee of this invention. Typical of the metal-modified resins which may be used are the zinc salts of para-octyl-, para-phenyl-, para-butyl-, para-nonyl- and para-chloro- phenolformaldehyde novalak resins and mixtures of these resins. Although the zinc-modified resins are preferred, the metal-modified resins may contain copper, zince, cadmium, aluminum, indium, tin, chromium, cobalt and nickel. Blends of the metal-modified novolak with non-modified novolak resins may be used.

Anionic polyermic materials, such as gum arabic or the synthetic anionic dispersing agents have been known to be useful for the dispersion of novolak resin particles in pressure-sensitive papers. Of the synthetic dispersing agents, a sodium salt of a copolymer of equal parts of maleic anhydride and diisobutylene (sold as a 25% aqueous solution of the salt as Tamol 731 by the Rohm & Haas Company) has been widely used. However, this dispersing agent, used alone, was not found to be satisfactory for the dispersion of the high solids (58%) metal-modified novolak resin used in the process of this invention. Rheologically stable resin dispersions above 40% solids could not be obtained using up to 4.5% of this dispersing agent, based on the resin content.

With the metal-modified novolak resins, it was found necessary to add an organo-phosphorus compound containing two or more phosphonic acid or alkali phosphonate groups per molecule in order to produce a rheologically stable dispersion of the resin. The particular organo-phorphorus compounds which can be used are the polyphosphonic acids and aminopolyphosphonic acids and the alkali metal salts of the polyphosphonic acid and aminopolyphosphonic acids sold under the trademark Dequest by Monsanto Industrial Chemical Co. Typical of these organo-phosphorus compounds are aminotrimethylphosphonic acid (Dequest 2000), pentasoidium aminotrimethylphosphonate (Dequest 2006), hydroxyethylidene-1,1-diphosphonic acid (Dequest 2010), potassium ethylenediaminetetraphosphonate (Dequest 2044), and potassium hexamethylenetetraphosphonate (Dequest 2054). Of these, the preferred compound is pentasodium aminotrimethylphosphonate which is sold in 38–42% aqueous solution of the compound as a deflocculating and sequestering agent.

The metal-modified resins are generally commercially available in flake or solid form. The flakes or lumps have to be broken down to particles about the size of fine sand. This may be done, for example, by dry grinding. The sand-like particles of resin are then slurried in water containing the dispersing agent and organo-phosphorus compound and ground by mechanical milling means, such as by a ball mill or attritor, to the desired particle size. During the grinding period, which may vary from several minutes to several hours depending on the size of the mill and volume to be ground, the temperature of the grind is desirably controlled at below 68° F by cooling, as by a water jacket. Higher temperatures appear to increase the grinding time necessary for particle reduction.

The amounts of dispersing agent and organo-phosphorus compound present during the grinding step are not critical. The amounts necessary to produce a rheologically stable grind, depend largely on the (1) temperature, (2) solids content, (3) metal content of the resin, (4) grinding time and (5) the finished particle size of the grind. More of the dispersing agent and/or the organo-phosphorus compound are required where the temperature, solids content and metal content of the resin are high, the grind is of longer duration and the resin particle size is low (lower than 10 microns). In general, rheologically stable aqueous dispersions of metal-modified novolak resins of an average particle size below 10 microns up to 58% resin particles may be produced using 1.5 to 3% of the anionic polymeric dispersing agent and 0.2 to 1.5% of the organo-phosphorus compound. All of these percentages are based on the solids content of these materials as compared to the total metal-modified novolak resin solids. Below the lower amounts of 1.5% of the anionic polymeric dispersing agent and 0.2% of the organo-phosphorus compound, the effect of the additions was noticeable but was not sufficient to insure the production of rheologically stable resin dispersions above 40% resin solids. The addition of more than 3% of the anionic polymeric dispersing agent and 1.5% of the organo-phosphorus compound did not materially improve the stability of the resin dispersion. Thus, it would be uneconomical to use more than 3% of the anionic polymeric dispersing agent and 1.5% of the organo-phosphorus compound.

The resin mixture may include, if desired, a nonmodified novolak resin. Other materials may be added to the resin mixture prior to grinding. A small amount of a defoamer, such as 0.5% of Nopco NDW (Nopco Corp.) based on resin solids, may be added to prevent excessive foaming of the grind and also of the resultant coating composition. Also, the addition of up to 1.5% sodium hexamethaphosphate appears to further lower the viscosity of the grind. If desired, up to 10% of a clay, such as a kaolin or silton clay, based on the resin content may be added prior to grinding.

In a preferred embodiment of the this invention, a resin mixture containing predominately a zinc-modified para-octyl novolak resin of 2.9% zinc content and having a 2.9% of a sodium salt of a copolymer of equal parts of maleic anhydride and diisobutylene, 0.22% pentasodium aminotrimethylphosphonate and 0.83% sodium hexametaphosphate based on the zinc-modified novolak solids, together with a small amount of a defoamer and approximately 7.5% kaolin clay, based on total solids, were ground together in a commercial size recirculating attritor (Szegvari 100 S) for 40 hours keeping the temperature below 71° F by means of a circulating water jacket. The particle size distribution of this grind was determined by counting with a Electrozone Oscilloscope series 100 with the following results.

| Particle Diameter, microns | Particles Larger than Particle Diameter, % |
|---|---|
| 4 | 100 |
| 5 | 94 |
| 6 | 60 |
| 7 | 33 |
| 8 | 18 |
| 9 | 9 |
| 10 | 0.4 |

The average particle diameter was 6.3 microns.

The above distribution that may be obtained using this invention. Such metal-modified resin grinds may be used in preparing color developing coating compositions as described in U.S. Pat. Nos. 3,455,721 and 3,672,935. These compositions may be coated on paper using known coating methods, for example, roll, blade or air knife coaters, and dried to give a color developing record sheet of exceptional quality. The important functional properties of this sheet, such as typewriter intensity, print speed, fade and decline resistance are not adversely affected by the presence of the organo-phosphorus compounds. The following examples illustrate but do not limit the invention.

stability of the dispersions. The results are given on Table 1.

Table 1

|  | Example No. | | | | | | | | | |
|---|---|---|---|---|---|---|---|---|---|---|
|  | 3 | 4 | 5 | 6 | 7 | 8 | 9 | 10 | 11 | 12 |
| Zinc-modified resin, grams | 1000 | 1000 | 1000 | 1000 | 1000 | 1000 | 1000 | 1000 | 1000 | 1000 |
| Kaolin clay (67% solids), grams | 124 | 124 | 124 | 124 | 124 | 124 | 124 | 124 | 124 | 124 |
| Defoamer, grams | 5.5 | 5.5 | 5.5 | 5.5 | 5.5 | 5.5 | 5.5 | 5.5 | 5.5 | 5.5 |
| 25% aqueous solution of sodium salt of 50 maleic anhydride/50 diisobutylene copolymer, grams | 80 | 80 | 80 | 80 | 80 | 80 | 80 | 26 | 54 | 106 |
| 40% aqueous solution of pentasodium aminotrimethylphosphonate, grams | 0 | 15 | 15 | 15 | 15 | 15 | 0 | 15 | 15 | 15 |
| Sodium hexametaphosphate, grams | 0 | 0 | 5 | 10 | 15 | 20 | 15 | 15 | 15 | 15 |
| pH | 7.4 | 7.4 | 7.7 | 7.8 | 8.0 | 7.9 | 7.6 | 7.6 | 7.8 | 7.9 |
| Solids, % | 48 | 49 | 49.6 | 50.6 | 48.3 | 50.9 | 49.5 | 43(a) | 50.2 | 48.4 |
| Brookfield viscosity - immediate, cps | | | | | | | | | | |
| 6 rpm | 5800 | 1000 | 500 | 450 | 200 | 500 | 1000 | (b) | 5000 | 260 |
| 60 rpm | 800 | 230 | 165 | 165 | 59 | 160 | 200 | (b) | 700 | 94 |
| 6 rpm | 4800 | 700 | 500 | 450 | 200 | 550 | 1000 | (b) | 4400 | 210 |
| Brookfield viscosity - after 7 days, cps | | | | | | | | | | |
| 6 rpm | 8400 | 750 | 900 | 700 | 300 | 850 | 4400 | (b) | 2600 | 350 |
| 60 rpm | 1640 | 235 | 240 | 295 | 135 | 235 | 1200 | (b) | 520 | 145 |
| 6 rpm | 8400 | 750 | 750 | 700 | 300 | 750 | 4400 | (b) | 2200 | 350 |
| Temperature of grind, ° F | 63 | 65 | 65 | 65 | 62 | 62 | 62 | 68 | 68 | 63 |

(a) Necessary to dilute to 43% solids to become fluid.
(b) Viscosity readings were too high to be determined.

EXAMPLE 1

(Control)

1000 grams of a commercially available zinc-modified para-octyl novolak resin were dry ground and mixed together with 124 grams of kaolin clay slurry (67% solids) and 500 grams of water containing 80 grams of a 25% aqueous solution of a sodium salt of a copolymer of equal parts of maleic anhydride and diisobutylene and 5.5 grams of Nopco NDW (a defoamer). The zinc content of the novolak resin was 2.9%. After mixing, an additional 500 grams of water was added to the mixture and the resin clay were dispersed by vigorous agitation and ground in a Szegvari 1S attritor for a period of 2.5 hours. The resulting resin grind was not fluid and had to be diluted with water before it could be removed from the attritor. The final solids was determined to be 42.5% and the Brookfield viscosities of thid diluted dispersion at 6, 60 and again at 6 rpm were respectively 675, 182 and 550 cps.

EXAMPLE 2

(Invention)

Example 1 was repeated except that 15 grams of a 40% aqueous solution of pentasodium aminotrimethylphosphonate and 15 grams of sodium hexamethaphosphate were added to the second 500 gram portion of water prior to mixing with the first 500 gram portion. This was ground for a period of 2.9 hours. The resulting dispersion was fluid and had a solids content of 48.8%. The Brookfield viscosities of this dispersion were 362, 127 and 362.

EXAMPLES 3 – 12

A series of resin grinds was made using the methods of Examples 1 and 2 and another zinc-modified para-octyl novolak resin, having a zinc content of 2.5%. In this series, the quantity of sodium salt of a copolymer of equal parts of maleic anhydride and diisobutylene as well as the quantity of pentasodium aminotrimethylphosphonate and sodium hexamethaphosphate are varied. In addition to the tests of Examples 1 and 2, additional Brookfield viscosities were taken after 7 days to determine the effect of the additives on the A comparison of the viscosities of the grinds before and after aging of Example 3 and 10 with Example 4 shows the advantage of using the combinations of the sodium salt of a copolymer of equal parts of maleic anhydride and diisobutylene and pentasodium aminotrimetnylphosphonate over using each of these materials individually. The grind containing the combination show very little change in viscosity after 7 days aging, whereas the grinds containing the individual materials were either solid or had very high viscosities before aging and still higher viscosities after aging. Although, all grinds were thixotropic, the loss of viscosity at 60 rpm was proportionally less with the combination grind than with the grind containing only the copolymer salt. Also, a comparison of the grinds of Examples 4 with 9 before and after aging shows the advantage of using, in combination with 2% of the copolymer salts, 0.6% of the pentasodium aminotrimethylphosphonate as compared with 1.5% sodium hexametaphosphate.

EXAMPLE 13 and 14

Examples 1 and 2 were repeated using a commercially available zince-modified para-octyl novolak resin containing 2.5% zinc. Each of the following resin mixtures was ground 20 minutes in a Szegvari 01S attritor.

|  | Example 13 | Example 14 |
|---|---|---|
| Zinc-modified resin, grams | 100 | 100 |
| Kaolin clay (67% solids), grams | 10.5 | 10.5 |
| Defoamer, grams | 0.5 | 0.5 |
| 25% aqueous solution of a sodium salt of a copolymer of equal parts of maleic anhydride and diisobutylene | 12 | 12 |
| Water, grams | 100 | 100 |
| 40% aqueous solution of pentasodium aminotrimethylphosphonate | 0 | 1.5 |
| Sodium hexametaphosphate, grams | 0 | 1.5 |

Each of the above grinds were incorporated into a color developing coating composition of the following composition at 30% solids.

| | |
|---|---|
| Kaolin clay | 64.1 % |
| Calcium carbonate | 3 % |
| Colloidal silica | 5.4 % |
| Zinc-modified resin particles | 12 % |
| Butadiene-styrene latex solids | 12 % |
| Hydroxyethyl starch | 3 % |
| Sodium hexametaphosphate | 0.5 % |

The above coating composition was applied with a No. 9 Mayer Bar to a light weight uncoated bond paper and dried to give a 4.5 No. (25 X 38-500) of dried coating. The dried dispersion coated paper was tested by placing the coated surfaces thereof in contact with the coated side of a paper coated with micro-capsules containing an oil solution of Crystal Violet Lactone. These sheet couples were imaged with an electric typewriter using the character "$m$" in a repeating block pattern, and the intensity of the images was measured as the ratio of the reflectance of the imaged area to the reflectance of the unimaged background, after an elapsed time of 20 minutes. Thus, the more intense or darker images show as lower values, and higher values indicate weak or faint images. This test is called Typewriter Intensity and may be expressed mathematically as $$T.I. = (100) (Ri/Ro)$$

where $Ri$ is reflectance of the imaged area and $Ro$ is reflectance of the background (unimaged) area as measured with a Bausch and Lomb Opacimeter. Two values are reported for typewriter intensity, one based on a 2-part assembly and one on a 4-part assembly.

Print speed was measured by imaging by one pass through a pair of calender rolls with image intensity measured after 30 seconds developement time. The lower the value reported, the faster the print speed.

Storage stability or decline of the coated papers was determined by a three hour exposure of the coated side of the paper to ultra-violet light in a Fadeometer followed by imaging and determination of typewriter intensity.

Fade resistance was measured by loss of image intensity upon three hours exposure of an imaged area to ultra-violet light, again using a Fadeometer. The effect of aging at 90% RH and 100° F on fade resistance and decline were also determined. The results are listed in Table 2.

EXAMPLE 15 and 16

Examples 13 and 14 were repeated using a zinc-modified p-phenyl novolak resin prepared by the melting together of 74.7% of the unmodified para-phenyl novolak resin, 13.4% ammonium carbonate and 11.7 zinc propionate in the manner described in the aforementioned U.S. application Ser. No. 528,039. The zinc content of the metal-modified resin was 3.6%. The results are listed in Table 2.

EXAMPLE 17 and 18

Examples 13 and 14 were repeated using a zinc-modified p-substituted novolak resin mixture prepared by melting together 74.7% of a mixed para-substituted novolak resin containing 60% para-octyl and 40% para-chloro groups, 13.4% ammonium carbonate and 11.7% zinc propionate in the manner described in the aforementioned U.S. application No. 528,039. The zinc content of the metal-modified resin was 3.6%. The results are listed in Table 2.

EXAMPLE 19 – 22

Example 14 was repeated in each of the following examples except that the 1.5 grams of a 40% aqueous solution of pentasodium aminotrimethylphosphonate were replaced with an equal amount of 40% solutions of other organo-phosphorus compounds as follows:

| Example No. | Chemical Identification |
|---|---|
| 19 | aminotrimethylphosphonic acid |
| 20 | hydroxyethylidene-1,1-diphosphonic acid |
| 21 | potassium ethylenediaminetetraphosphonate |
| 22 | potassium hexamethylenetetraphosphonate |

The results are included in Table 2 which follows:

Table 2

| | Example No. | | | | | | | | | |
|---|---|---|---|---|---|---|---|---|---|---|
| | 13 | 14 | 15 | 16 | 17 | 18 | 19 | 20 | 21 | 22 |
| Zinc-modified resin grind | (a) | (a) | (b) | (b) | (c) | (c) | (a) | (a) | (a) | (a) |
| Contains Organo-phosphorus compound | No | (e) | No | (e) | No | (e) | (f) | (g) | (h) | (i) |
| pH of grind | 8.3 | 8.3 | 8.4 | 8.5 | 8.1 | 8.3 | 7.0 | 6.9 | 8.2 | 8.3 |
| Solids of grind, % | 46.2 | 47.4 | 46 | 46.8 | 41.8(d) | 47.4 | 50.5 | 51.6 | 49.6 | 48.0 |
| Brookfield viscosity, immediate, cps | | | | | | | | | | |
| 6 rpm | 225 | 110 | 400 | 200 | 6000 | 425 | 115 | 100 | 135 | 95 |
| 60 rpm | 125 | 70 | 180 | 145 | 920 | 182 | 66 | 64 | 85 | 61 |
| 6 rpm | 200 | 110 | 250 | 200 | 6000 | 400 | 115 | 100 | 138 | 95 |
| Appearance on standing 24 hours | solid | fluid | — | — | — | — | — | — | — | — |
| Temperature of grind, ° F | 66 | 67 | 65 | 65 | 65 | 64 | 70 | 70 | 70 | 69 |
| Typewriter intensity, 2 part | 64 | 65 | 62 | 59 | 63 | 66 | 65 | 66 | 64 | 66 |
| Typewriter intensity, 4 part | 52 | 54 | 55 | 53 | 57 | 60 | 56 | 58 | 57 | 58 |
| Print speed | 56 | 57 | 60 | 59 | 68 | 68 | 57 | 57 | 58 | 58 |
| 3 hour Fadeometer, fade | 79 | 80 | 77 | 78 | 78 | 83 | 81 | 83 | 78 | 80 |
| 3 hour Fadeometer, decline | 66 | 66 | 67 | 67 | 74 | 76 | 67 | 66 | 67 | 68 |
| Aging, 90% RH and 100° F, fade | | | | | | | | | | |
| 3 weeks | 81 | 81 | — | — | — | — | — | — | — | — |
| , decline | | | | | | | | | | |
| 3 weeks | 73 | 71 | — | — | — | — | — | — | — | — |

(a) p-octyl novolak resin
(b) p-phenyl novolak resin
(c) 60% p-octyl and 40% p-chloro novolak resins
(d) Necessary to dilute to 41.8% solids to become fluid
(e) Pentasodium aminotrimethylphosphonate
(f) Aminotrimethylphosphonic acid
(g) Hydroxyethylidene-1,1-diphosphonic acid
(h) Potassium ethylenediaminetetraphosphonate
(i) Potassium hexamethylenetetraphosphonate For each type of metal-modified para-substituted novolak resin in the above Table 2, the rheological properties of the dispersions containing the sodium salt of a copolymer of equal parts maleic anhydride and diisobutylene were improved by the addition of small amounts of pentasodium aminotrimethylphosphonate. This is particularly evident in a comparison of Examples 13 and 14 in which the resin dispersion containing no organo-phosphorus compound was solid after standing for 24 hours. Furthermore, the addition of the organo-phosphorus compounds to the dispersions did not materially affect the test results of the Typewriter Intensity, print speed and Fadeometer made on pressure-sensitive papers prepared from these dispersions of metal-modified novolak resins. A comparison of Examples 14 and 19 through 22 show that all of the organo-phosphorus compounds were effective.

I claim:

1. In a method of producing a color developing record sheet for pressure sensitive papers comprising the steps of grinding together an aqueous mixture of a metal-modified novolak resin and an anionic polymeric dispersing agent for said novolak resin to form an aqueous dispersion of finely divided metal-modified novolak resin particles, said aqueous dispersion containing up to about 58% of said metal-modified resin particles; preparing a coating composition by mixing together said aqueous mixture of said finely divided metal-modified novolak resin particles and a binder for said resin particles; applying said coating composition to a paper base; and drying said coated paper; the improvement comprising adding to said aqueous mixture at least 0.2% by weight of an organo-phosphorus compound based on the weight of said resin particles, said organo-phosphorus compound containing two or more phosphonic acid or alkali metal phosphonate groups per molecule prior to the grinding step, wherein said anionic polymeric dispersing agent is present in the amount of at least 1.5% by weight based on the weight of said resin particles.

2. The method of claim 1 in which the coating composition additionally contains clay particles.

3. The method of claim 1 in which the aqueous dispersion of finely divided metal-modified novolak resin particles contains 40% to 58% of said resin particles.

4. The method of claim 1 in which the organo-phosphorus compound is selected from the group consisting of polyphosphonic acids and aminopolyphosphonic acids and the alkali metal salts of the polyphosphonic acid and aminopolyphosphonic acids.

5. The method of claim 1 in which the organo-phosphorus compound is pentasodium aminotrimethylphosphonate.

6. The method of claim 1 in which the organo-phosphorus compound is aminotrimethylphosphonic acid.

7. The method of claim 1 in which the organo-phosphorus compound is hydroxyethylidene-1,1-diphosphonic acid.

8. The method of claim 1 in which the organo-phosphorus compound is potassium ethylenediaminetetraphosphonate.

9. The method of claim 1 in which the organo-phosphorus compound is potassium hexamethylenetetraphosphonate.

10. The method of claim 1 in which the organo-phosphorus compound is present in the amount of 0.2 to 1.5% solids, based on the weight of said resin and the anionic polymeric dispersing agent is present in the amount of 1.5 to 3.0% solids, based on the weight of the metal-modified novolak resin.

11. The method of claim 1 in which the average particle size of the metal-modified resin particles is below 10 microns.

12. The method of claim 1 in which the anionic polymeric dispersing agent is a sodium salt of a copolymer of equal parts of maleic anhydride and diisobutylene.

13. The method of claim 1 in which sodium hexametaphosphate is additionally added to the aqueous mixture prior to grinding.

14. The method of claim 1 in which the metal-modified novolak resin is a zinc-modified para-substituted phenolformaldehyde novolak resin.

15. The method of claim 14 in which the zinc-modified para-substituted phenolformaldehyde novolak resin is selected from the group consisting of zinc-modified paraphenyl-phenolformaldehyde resins, zinc-modified para-octylphenolformaldehyde resins, and zinc-modified para-chlorophenolformaldehyde resins and mixtures thereof.

* * * * *